United States Patent [19]
LeVey et al.

[11] Patent Number: 6,132,153
[45] Date of Patent: Oct. 17, 2000

[54] ZERO ON PREVAILING TORQUE NUT

[75] Inventors: Kenneth R. LeVey, West Chicago; Ned J. Gruca, St. Charles, both of Ill.

[73] Assignee: Illinois Tool Works Inc., Glenview, Ill.

[21] Appl. No.: 09/388,757

[22] Filed: Sep. 2, 1999

[51] Int. Cl.$^7$ .............................. F16B 37/08; F16B 39/22
[52] U.S. Cl. ......................... 411/290; 411/277; 411/433; 411/937.2
[58] Field of Search ..................................... 411/277, 278, 411/290, 291, 222, 223, 432, 433, 937.2

[56] References Cited

U.S. PATENT DOCUMENTS

| | | | |
|---|---|---|---|
| 259,552 | 6/1882 | Kingsley | 411/290 |
| 915,830 | 3/1909 | Craven | 411/937.2 |
| 1,885,459 | 11/1932 | McDonnell . | |
| 2,576,890 | 11/1951 | Poupitch | 411/937.2 |
| 5,688,091 | 11/1997 | McKinnlay . | |

*Primary Examiner*—Neill Wilson
*Attorney, Agent, or Firm*—Lisa M. Soltis; Mark W. Croll; John P. O'Brien

[57] ABSTRACT

A lock nut having a body member with a threaded axial bore and a washer having an axial opening coupled to a bottom end portion thereof so that the opening of the washer is aligned substantially with the threaded axial bore. The washer has one or more fingers with threaded finger tip portions partially defining the opening thereof. The threaded finger tip portions of the washer are in-phase helically with the threaded axial bore of the body member. A recess is disposed between the washer and the body member, and a protruding portion of the washer extends from the bottom end portion of the body member.

21 Claims, 3 Drawing Sheets

ZERO ON PREVAILING TORQUE NUT

BACKGROUND OF THE INVENTION

The invention relates generally to fastening systems and lock nuts therefor that are undeformed prior to installation.

Lock nuts are known generally and used widely. U.S. Pat. No. 1,885,459 entitled "Lock Nut", for example, discloses a lock nut having a body portion with a threaded bore and a plurality of threaded gripping jaws spaced axially from the body portion.

It is also known generally to couple a washer to the body portion of a lock nut as disclosed for example in U.S. Pat. No. 5,688,091 entitled "Self-Locking Fastener With Captive Washer" issued on Nov. 18, 1997.

The present invention is drawn toward advancements in the art of fastening systems and locking nuts therefor.

An object of the present invention is to provide novel fastening systems and novel lock nuts therefor that overcome problems in the art.

Another object of the invention is to provide novel fastening systems and novel lock nuts therefor that are economical.

A further object of the invention is to provide novel fastening systems and novel lock nuts therefor having generally improved performance.

Another object of the invention is to provide novel fastening systems and novel lock nuts therefor having a zero or at least a substantially reduced installation torque.

Yet another object of the invention is to provide novel fastening systems and novel lock nuts therefor having relatively consistent prevailing torque performance over several installation and removal cycles.

Still another object of the invention is to provide novel fastening systems and novel lock nuts therefor having reduced statistical spread.

A more particular object of the invention is to provide novel fastening systems and novel lock nuts therefor comprising generally a body member with a threaded axial bore and a washer having an axial opening. The washer is coupled to a bottom end portion of the body member so that the opening of the washer is aligned substantially with the threaded axial bore. The washer has one or more fingers with corresponding threaded finger tip portions partially defining the opening thereof The threaded finger tip portions of the washer are in-phase helically with the threaded axial bore of the body member. A recess is disposed between the washer and the body member, and a protruding portion of the washer extends from the bottom end portion of the body member generally opposite the recess.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
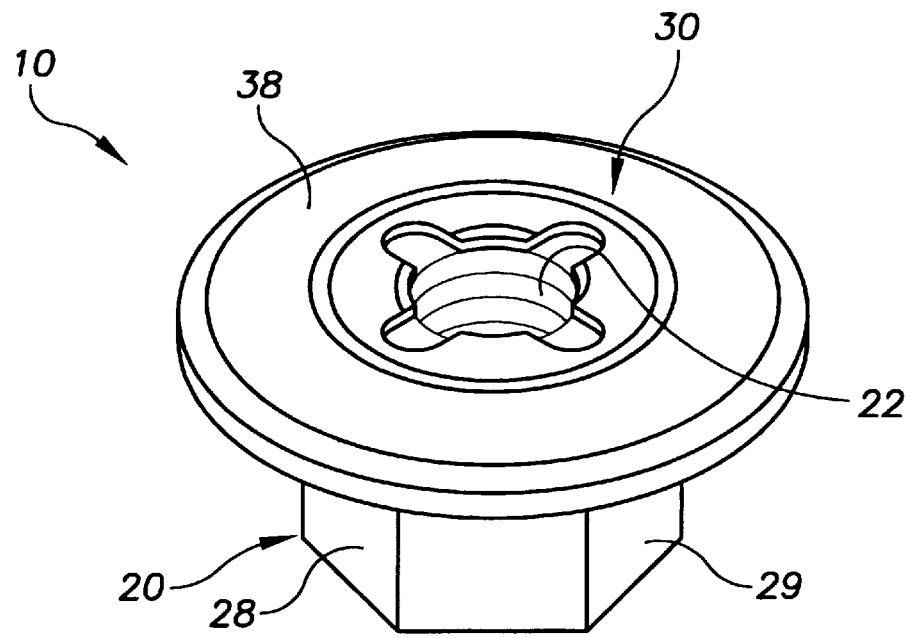
FIG. 1 is a bottom isometric view of a lock nut according to the present invention.
Figure 3:
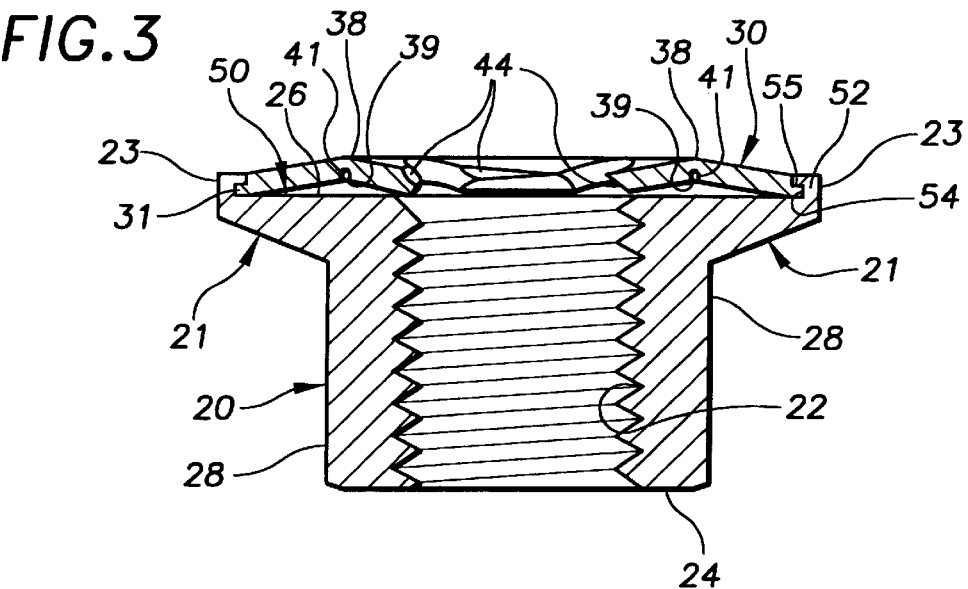
FIG. 3 is a sectional view of a lock nut according to the present invention prior to installation and deformation of the washer portion thereof.

FIGS. 1 and 3 illustrate a lock nut 10 according to an exemplary embodiment of the invention for use in a fastening system discussed further below. The lock nut 10 comprises generally a body member 20 and a washer 30 coupled thereto. The washer is deformable upon installation of the lock nut to provide a prevailing torque, and the washer is preferably resilient to permit reuse of the lock nut, as discussed more fully below.

The body member 20 comprises generally a bottom end portion and a threaded axial bore 22 extending therethrough. In the exemplary embodiment of FIG. 2, the threaded bore extends fully through the body member 20, and more particularly through the top and bottom ends 24 and 26 thereof. In other embodiments, however, the threaded axial bore 22 may extend only partially into the body member 20 from the bottom end thereof, terminating short of the top end of the body member.

Figure 2:
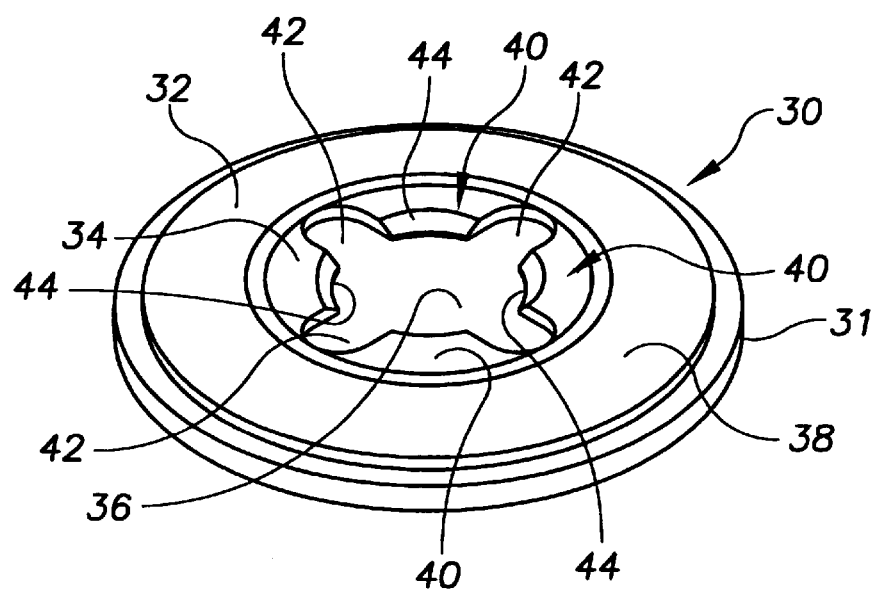
FIG. 2 is an isometric view of a washer portion of the lock nut of FIG. 1.

In FIGS. 1 and 2, the body member also comprises an outer side portion 28 preferably having a tool engagement surface thereon. In FIG. 1, for example, the outer portion 28 of the body member has a hex-shape wrenching surface 29, which is engagable by a hex wrench or hex socket tool.

In FIG. 2, the washer 30 comprises generally opposing top and bottom sides with a radial outer portion 32, a radial inner portion 34, and an axial opening 36 therethrough. The washer also comprises generally one or more fingers with corresponding threaded finger tip portions partially defining the opening thereof. In FIGS. 1 and 2, the washer 30 comprises a plurality of fingers 40 each separated by a corresponding slot 42. The fingers 40 are preferably arranged substantially symmetrically about the opening 36 of the washer. The plurality of fingers 40 each have a corresponding threaded finger tip portion 44 that partially defines the opening 36 of the washer 30. In the exemplary embodiment, the washer 30 has four fingers 40, but in other embodiments the washer may have more or less fingers with corresponding threaded tip portions.

The washer 30 also comprises generally a protruding portion extending from the top side thereof between the outer and inner radial portions thereof. In the exemplary embodiment of FIGS. 1–3, the protruding portion of the washer is a generally annular protrusion 38 extending from the top side of the washer between the outer and inner radial portions thereof, illustrated best in the sectional view of FIG. 3.

The washer 30 is coupled generally to the bottom end portion of the body member 20 so that the opening 36 of the washer is aligned substantially with the threaded axial bore 22 of the body member, and so that the protruding portion of the washer protrudes or extends away from the bottom end portion of the body member. The protruding portion of the washer is thus engagable with a work piece to deform the washer upon installation of the lock nut, as discussed further below. Also, the washer is preferably non-rotationally and non-axially movable relative to the body member after coupling to ensure in-phase alignment of the threaded axial bore 22 and threaded finger tip portions 44 prior to and during the initial stages of lock nut installation, also discussed further below.

In the exemplary embodiment, illustrated best in FIG. 3, the body member 20 has a washer recess 50 on the bottom end portion thereof. The washer recess 50 forms the bottom end 26 of the body member, and has a recess side wall 52 with a flange recess 54 disposed therein for receiving and retaining a portion of the washer upon assembly.

Figure 4:
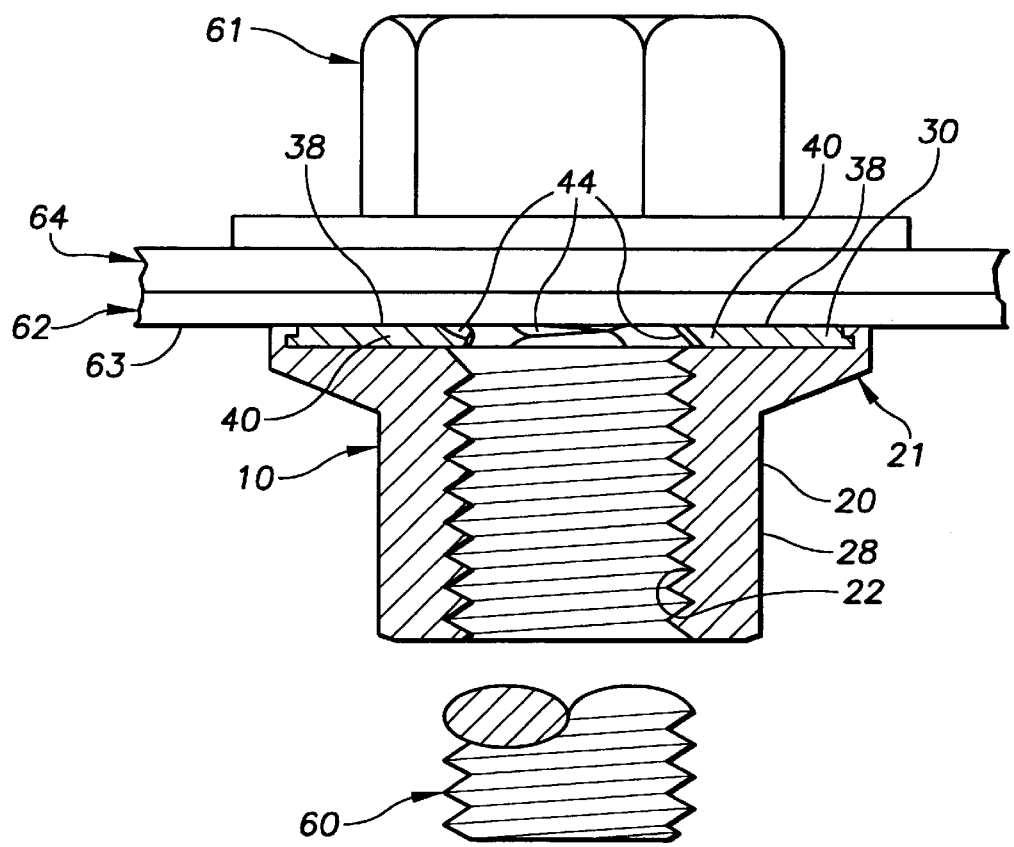
FIG. 4 is a partial sectional view of a fastener system including a lock nut according to the present invention after deformation of the washer portion.

In the exemplary embodiment, illustrated best in FIGS. 3 and 4, the body member 20 has a skirt 21 extending outwardly from the outer side portion 28 thereof. The skirt 21 extends radially outwardly beyond the tool engagement surface of the body member, and forms a portion of the bottom end portion thereof. In FIG. 3, the washer recess 50 is formed partially in a lower portion 23 of the skirt 21. In other embodiments, the lock nut 10 does not include the skirt.

The washer also comprises generally a washer flange extending outwardly from an outermost radial portion thereof. The washer flange is disposed in the corresponding flange recess of the body member to couple the washer thereto. In FIGS. 2 and 3, the washer flange is an annular member 31 extending outwardly from an outermost radial portion thereof, but in other embodiments the washer flange may comprise a plurality of discrete fingers protruding outwardly therefrom. In FIG. 3, the annular member 31 is disposed and retained in the corresponding annular flange recess 54 of the recess side wall 52 to retain the washer on the body member. The alternative discrete fingers may also be disposed and retained in the annular flange recess 54.

The lock nut also comprises a recess disposed between the body member and the washer. The recess is located generally opposite the protruding portion of the washer to permit deformation of the washer upon installation of the lock nut. In the exemplary embodiment, illustrated best in FIG. 3, the recess is generally annular depression 39 disposed about the opening of the washer 30 on the bottom side thereof adjacent the bottom end 26 of the body member 20. The generally annular depression 39 of the washer 30 is preferably located approximately midway between innermost and outermost radial portions thereof, generally opposite the generally annular protruding portion 38 thereof. The washer 30 thus has a generally W-shape sectional profile, also illustrated best in FIG. 3.

In FIG. 3, the washer 30 also includes a generally annular groove 41 disposed about the opening in the recess on the bottom side thereof. The groove 41 allows deformation of the washer at lower clamp loads, as discussed more fully below. The groove 41 also allows the washer to be hardened without substantially increasing the clamp load required to deform the washer.

In other embodiments, the recess may be formed by a depression in the bottom end 26 of the body member generally opposite the protruding portion of the washer. According to this alternative configuration, a depression is not required on the bottom side of the washer, since the depression in the body member will accommodate a portion of the washer to permit deformation thereof upon installation of the lock nut. In other embodiments, the recess may be formed by a depression in both the washer and the body member.

The threaded finger tip portion, and in the exemplary embodiment the plurality of threaded finger tip portions 44 are in-phase helically with the threaded axial bore 22 of the body member 20 prior to installation of the lock nut. The in-phase relationship between the threaded axial bore and the threaded tip portion provides a lock nut having an installation torque that is zero or negligible, at least during the first installation of the lock nut.

The washer and body member may be assembled by crimping portions of the recess side wall over on top of the washer flange to capture the washer between the crimped side wall portion and bottom end of the body member. In the exemplary embodiment, after the washer 30 is disposed in the washer recess 50, portions 55 of the recess side wall 52 are crimped over the annular washer flange 31 to form the annular flange recess 54, which captures and retains the washer. The crimping operation ensures that the washer 30 is non-rotationally and non-axially movable relative to the body member 20 during the initial stages of assembly of the lock nut about a threaded shaft as discussed above.

The threaded axial bore 22 of the body member and the threaded finger tip portions 44 of the washer are preferably threaded simultaneously with a tap or other known threading means in a threading operation after the washer is securely assembled to the body member to ensure an in-phase thread alignment between the threaded axial bore 22 of the body member and the threaded finger tip portions 44 of the washer.

FIG. 4 illustrates a fastener system comprising generally the lock nut 10 and a threaded shaft 60, illustrated only partially, useable for fastening an article 62 to a work piece 64. In the exemplary embodiment, the threaded shaft 60 is part of a bolt with a head 61 that extends through the work piece 64 and through the article 62. In other embodiments, however, the threaded shaft 60 may be a part the work piece or the article, for example the threaded shaft 60 may be welded thereto.

In FIG. 4, the lock nut 10 is disposed about the threaded shaft 60 so that the protruding portion 28 of the washer 30 engages a surface 63 of the workpiece or of the article to deform the washer 30. Those of ordinary skill in the art will understand that the lock nut may engage either the work piece or the article to cause deformation of the washer, depending on whether the bolt head 61 engages the article or the work piece. Thus references to the work piece in the present specification and the claims thereof must be interpreted to be mean either the work piece or the article, since deformation of the lock nut may result from engagement with either the work piece or the article.

As discussed above, the lock nut 10 is undeformed prior to installation, and more particularly prior to engagement thereof with the work piece upon installation. Also discussed above, the threaded axial bore 22 of the body member and the threaded finger tip portions 44 of the washer 30 are in-phase helically prior to deformation of the washer 30 so that the lock nut 10 of the present invention has a zero installation torque, at least on its first installation. Thus as the lock nut 10 is disposed about and advanced along the threaded shaft 60 toward the work piece there is zero or very little torque required to advance the lock nut in comparison to the relatively substantial torque required to install prior art lock nuts that are deformed prior to installation.

As the lock nut 10 is advance toward the work piece, the protruding portion 38 of the washer 30 eventually engages the surface 63 thereof. Continued advancement of the lock nut 10 along the threaded shaft 60 causes deformation of the washer 30, and more particularly displacement of portions thereof into the recess between the washer and the body member, resulting in a generally flattening of the washer, including the fingers 40 and possibly threaded tip portions 44 thereof. As the washer is deformed, the threaded finger tip portions 44 are no longer in-phase, or are misaligned, with the threaded axial bore 22 resulting in substantially increased frictional engagement with the threaded shaft 60, thereby creating the locking action, or prevailing torque.

As the washer is deformed, the diameter of the opening 36 therethrough decreases slightly, resulting from the effective elongation of the relatively flattened fingers 40 of the washer. The decreasing opening diameter thus constricts the threaded finger tip portions 44 about the threaded shaft 60 further increasing the prevailing torque thereon.

The inventors of the present invention believe presently that the constriction of the fingers 40 about the threaded shaft 60 does not substantially contribute to the prevailing torque, and that the predominant factor in this regard is the out-of-phase, or misalignment, of the threaded axial bore 22 and the threaded finger tip portions 44. In either case, it is likely advantageous to increase the contact surface area between the threaded shaft and the threaded finger tip portions, for example by increasing the number of fingers or by increasing the width of the threaded finger tip portions, to increase the frictional engagement with the shaft.

The body member 20 is formed generally of a metal material, for example in a forging operation, as is well known to those of ordinary skill in the art. The washer 30 is also formed of a metal material preferably in a stamping operation. As discussed above, the body member 20 and the washer 30 are threaded at the same time upon assembly thereof to ensure an in-phase helical thread relationship therebetween, thereby providing a zero or at least substantially reduced installation torque.

Figure 5:
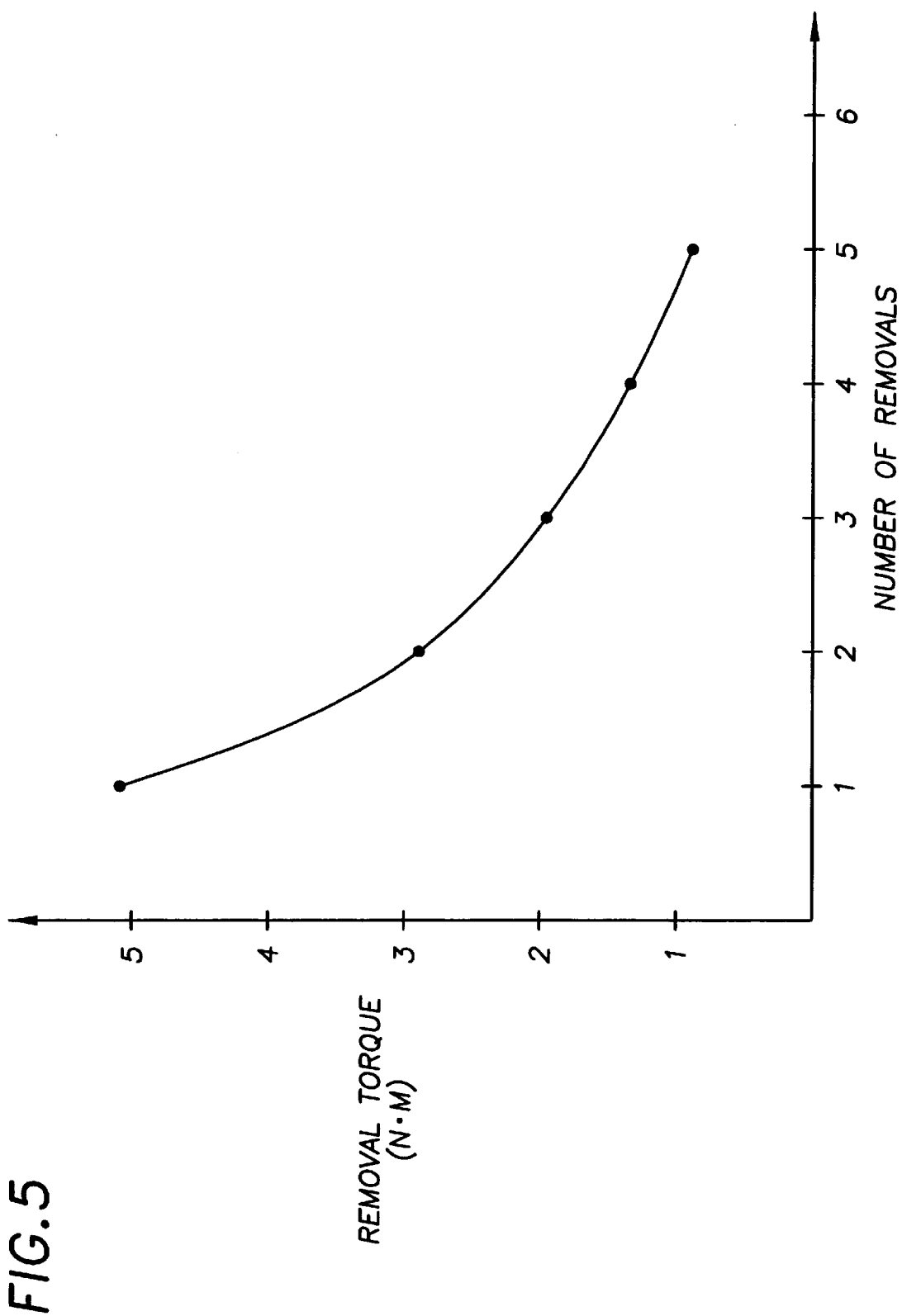
FIG. 5 is a graphical illustration of the torque performance of a lock nut according to the present invention.

FIG. 5 is a graphical illustration of the torque performance of a standard M12 flange lock nut according to the present invention comprising a non-heat treated 1050 steel washer having an axial thickness, between the top and bottom sides thereof, of approximately 0.060 inches and a maximum thickness prior to deformational flattening of approximately 0.072 inches.

The exemplary lock nut of the present invention has generally a relatively low installation, or first on torque, in comparison to prior art lock nuts. The first on torque is in fact substantially zero, resulting from the lack of deformation of the washer, and more particularly from the in-phase relationship between the threaded axial bore 22 of the body member and the threaded finger tip portions 44 of the washer. Subsequent installation torques may be somewhat greater than zero due to some residual deformation of the washer upon removal of the lock nut from the threaded shaft after the initial installation. The residual washer deformation is largely a characteristic of the steel from which the washer is produced.

In FIG. 5, the exemplary lock nut has a relatively high first off torque, which results from the deformation of the washer and frictional engagement thereof with the threaded shaft, as discussed above. FIG. 5 also illustrates that the lock nuts of the present invention have a relatively consistent torque performance over several installation and removal cycles. More particularly, the torque performance declines only gradually with increasing installation and removal cycles, which is a desirable characteristic of the lock nuts, indicating that the lock nuts may be reused several times without substantial degradation in the retention performance thereof. The lock nuts of the present invention are thus more likely to meet or exceed industry performance specifications.

The torque performance of the lock nuts of the present invention also have a relatively reduced statistical spread over several installation and removal cycles, which is yet another remarkable characteristic of the present invention. The reduced statistical spread of the torque performance is a very important manufacturing and applications consideration, since it results in the rejection of fewer parts for failure to comply with industry performance specifications for a particular application, and decreases the probability that a lock nut that fails to comply with a required specification will be used in a particular application.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A lock nut comprising:

a body member having a bottom end portion with a threaded axial bore;

a washer having a radial outer portion and a radial inner portion with an axial opening therethrough, the washer having a top side and a bottom side, the washer having a finger with a threaded finger tip portion partially defining the opening thereof, the washer having a protruding portion extending from the top side of the washer between the outer and inner radial portions thereof, the washer coupled to the bottom end portion of the body member with the opening thereof aligned substantially with the threaded axial bore and the protruding portion of the washer protruding from the bottom end portion of the body member, the washer having a groove disposed on the bottom side thereof about the opening therethrough;

a recess disposed between the washer and the body member, the threaded finger tip portion of the washer is in-phase helically with the threaded axial bore of the body member.

2. The lock nut of claim 1, the body member has an outer side portion with a tool engagement surface.

3. The lock nut of claim 1, the washer is non-rotatably coupled to the body member.

4. The lock nut of claim 1, the washer comprises a plurality of fingers each having a corresponding threaded finger tip portion partially defining the opening thereof, the plurality of threaded finger tip portions are in-phase helically with the threaded axial bore of the body member.

5. The lock nut of claim 2, the plurality of fingers are separated by a corresponding slot, the plurality of fingers are arranged substantially symmetrically about the opening of the washer.

6. The lock nut of claim 1, the protruding portion of the washer is a generally annular protrusion extending from the top side of the washer between the outer and inner radial portions thereof, the generally annular protrusion protrudes from the bottom end portion of the body member, the washer comprises a plurality of fingers each having a corresponding threaded finger tip portion partially defining the opening thereof, the plurality of fingers are separated by a corresponding slot extending from the opening toward the annular protrusion, the plurality of threaded finger tip portions are in-phase helically with the threaded axial bore of the body member.

7. The lock nut of claim 6, the recess is a generally annular depression disposed about the opening of the washer on the bottom side thereof adjacent the bottom end portion of the body member.

8. The lock nut of claim 7, the generally annular protrusion is located approximately midway between innermost and outermost radial portions of the washer, the washer has a generally W-shape sectional profile.

9. The lock nut of claim 1, body member has a washer recess on the bottom end portion thereof, the washer recess has a recess side wall, the washer has a washer flange extending outwardly from an outermost radial portion thereof, the washer flange is disposed in a corresponding flange recess in the recess side wall.

10. The lock nut of claim 9, the body member has an outer side portion with a tool engagement surface, the body member has a skirt extending outwardly from the outer side portion thereof, the skirt forms a portion of the bottom end portion of the body member, the washer recess is formed partially in the skirt.

11. A fastener system useable for fastening an article to a workpiece, the system comprising:

a threaded shaft protruding from the workpiece;

a lock nut having a body member with a bottom end portion and a threaded axial bore, the lock nut having a washer with a radial outer portion and a radial inner portion and an axial opening therethrough, the washer having a top side and a bottom side, the washer having a finger with a threaded finger tip portion partially defining the opening thereof, the washer having a protruding portion extending from the top side of the washer between the outer and inner radial portions thereof, the washer having a groove disposed on the bottom side thereof about the opening, the washer coupled to the bottom end portion of the body member with the opening thereof aligned substantially with the threaded axial bore and the protruding portion of the washer protruding from the bottom end portion of the body member;

a recess disposed between the washer and the body member, the lock nut is disposable about the threaded shaft so that the protruding portion of the washer is engageable with the workpiece to deform the washer into the recess, the threaded finger tip portion in-phase helically with the threaded axial bore prior to deformation of the washer, and the threaded finger tip portion not in-phase with the threaded axial bore after deformation of the washer.

12. The system of claim 11, the protruding portion of the washer is a generally annular protrusion extending from the top side of the washer between the outer and inner radial portions thereof, the generally annular protrusion protrudes from the bottom end portion of the body member, the washer comprises a plurality of fingers each having a corresponding threaded finger tip portion partially defining the opening thereof, the plurality of fingers are separated by a corresponding slot extending from the opening toward the annular protrusion, the plurality of threaded finger tip portions are in-phase helically with the threaded axial bore prior to deformation of the washer, the plurality of threaded finger tip portions are not in-phase with the threaded axial bore after deformation of the washer.

13. The system of claim 12, the recess is a generally annular depression disposed about the opening of the washer on the bottom side thereof adjacent the bottom end portion of the body member.

14. The system of claim 13, the generally annular protrusion is located approximately midway between innermost and outermost radial portions of the washer, the washer has a generally W-shape sectional profile.

15. The system of claim 11, body member has a washer recess on the bottom end portion thereof, the washer recess has a recess side wall, the washer has a washer flange extending outwardly from an outermost radial portion thereof, the washer flange is disposed in a corresponding flange recess in the recess side wall.

16. The system of claim 11, the body member has an outer side portion with a tool engagement surface, the body member has a skirt extending outwardly from the outer side portion thereof, the skirt forms a portion of the bottom end portion of the body member, the washer recess is formed partially in the skirt.

17. The system of claim 11, the body member has an outer side portion with a tool engagement surface.

18. The system of claim 11, the washer is non-rotatably coupled to the body member.

19. A lock nut comprising:

a body member having a bottom end portion with a threaded axial bore, the body member having an outer side portion with a tool engagement surface, the body member having a skirt extending outwardly from the outer side portion thereof, the skirt forms a portion of the bottom end portion of the body member;

a washer recess on the bottom end portion of the body member, the washer recess has recess side wall with a flange recess;

a washer having top and bottom sides and an axial opening therethrough, the washer having a finger with a threaded finger tip portion partially defining the opening thereof, the washer having a protruding portion extending from the top side thereof about the opening, the washer coupled to the bottom end portion of the body member with the opening thereof aligned substantially with the threaded axial bore, the protruding portion of the washer protruding from the bottom end portion of the body member, the washer has a washer flange extending outwardly from a radial outer portion thereof, the washer flange is disposed in the flange recess of the recess side wall;

a recess disposed between the washer and the body member, the threaded finger tip portion of the washer is in-phase helically with the threaded axial bore of the body member.

20. A lock nut comprising:

a body member having a threaded bore and a washer recess on a bottom end portion thereof;

a washer having a W-shaped sectional profile characterized by an annular trough on one side of the washer and an annular ridge on an opposite side thereof, the washer having a plurality of fingers with corresponding threaded finger tip portions partially defining a threaded opening thereof, the washer disposed and retained in the washer recess of the body member with the threaded opening of the washer in-phase helically with the threaded bore of the body member, the annular ridge of the washer extending away from the bottom end portion of the body member, threaded finger tip portions of the washer extending toward the body member.

21. The lock nut of claim 20, an annular groove disposed in the trough of the washer about the threaded opening thereof.

* * * * *